United States Patent [19]
Finger et al.

[11] Patent Number: 5,919,137
[45] Date of Patent: Jul. 6, 1999

[54] ULTRASONIC DIAGNOSTIC IMAGING SYSTEM WITH PROGRAMMABLE ACOUSTIC SIGNAL PROCESSOR

[75] Inventors: David J. Finger, San Jose; Jonathan Bernard, Santa Clara; Albert Gee, Los Altos, all of Calif.

[73] Assignee: Acuson Corporation, Mountain View, Calif.

[21] Appl. No.: 08/760,083

[22] Filed: Dec. 4, 1996

[51] Int. Cl.⁶ ............................................. A61B 8/00
[52] U.S. Cl. ............................................ 600/443
[58] Field of Search .................... 600/443, 447, 600/437

[56] References Cited

U.S. PATENT DOCUMENTS

| | | | |
|---|---|---|---|
| 4,063,549 | 12/1977 | Beretsky et al. | 128/2 |
| 4,141,347 | 2/1979 | Green et al. | |
| 4,182,173 | 1/1980 | Papadofrangakis et al. | 73/194 |
| 4,520,671 | 6/1985 | Hardin | 73/620 |
| 4,603,350 | 7/1986 | Arbeiter et al. | 358/140 |
| 4,689,675 | 8/1987 | Tchorbajian et al. | 358/140 |
| 4,737,921 | 4/1988 | Goldwasser et al. | |
| 4,773,425 | 9/1988 | Saitou | |
| 4,783,839 | 11/1988 | Bamber | |
| 4,785,818 | 11/1988 | Hardin | 600/443 |
| 4,787,393 | 11/1988 | Fukukita et al. | |
| 4,817,433 | 4/1989 | Sato | |
| 5,007,428 | 4/1991 | Watmough | 128/660.04 |
| 5,109,858 | 5/1992 | Nishiyama et al. | |
| 5,172,103 | 12/1992 | Kita | |
| 5,182,728 | 1/1993 | Shen et al. | |
| 5,369,624 | 11/1994 | Fukukita et al. | 367/103 |
| 5,388,079 | 2/1995 | Kim et al. | 367/103 |
| 5,390,674 | 2/1995 | Robinson et al. | 600/443 |
| 5,396,285 | 3/1995 | Hedberg et al. | 348/163 |
| 5,409,007 | 4/1995 | Saunders et al. | 600/447 |
| 5,437,281 | 8/1995 | Lin et al. | 600/443 |
| 5,471,989 | 12/1995 | Roundhill et al. | 128/660.04 |
| 5,476,097 | 12/1995 | Robinson | |
| 5,544,128 | 8/1996 | Kim et al. | 367/119 |
| 5,546,807 | 8/1996 | Oxaal et al. | 73/606 |
| 5,609,155 | 3/1997 | Guracar | 600/454 |
| 5,653,234 | 8/1997 | Kim et al. | 600/437 |
| 5,722,412 | 3/1998 | Pflugrath et al. | 600/459 |

FOREIGN PATENT DOCUMENTS

| | | |
|---|---|---|
| 0 116 901 A2 | 8/1984 | European Pat. Off. |
| 0 486 269 B1 | 4/1996 | European Pat. Off. |
| 2 616 914 | 12/1988 | France |
| 54-162881 | 12/1979 | Japan |
| 57-173043 | 10/1982 | Japan |
| 58-41538 | 3/1983 | Japan |
| 59-20155 | 2/1984 | Japan |
| 60-168440 | 8/1985 | Japan |
| 61-288847 | 12/1986 | Japan |
| 62-38144 | 2/1987 | Japan |
| 62-148656 | 7/1987 | Japan |
| 63-11137 | 1/1988 | Japan |
| 63-267342 | 11/1988 | Japan |
| 63-317138 | 12/1988 | Japan |
| 64-86947 | 3/1989 | Japan |
| 1-185251 | 7/1989 | Japan |
| 2-193655 | 7/1990 | Japan |

(List continued on next page.)

OTHER PUBLICATIONS

A.N. Evans, PhD., et al.—Mode Filtering to Reduce Ultrasound Speckle for Feature Extraction, *IEE Proc.—Vis. Images Signal Process.*, vol. 142, No. 2, Apr. 1995.

(List continued on next page.)

*Primary Examiner*—Francis J. Jaworski
*Attorney, Agent, or Firm*—Brinks Hofer Gilson & Lione

[57] ABSTRACT

An ultrasonic imaging system includes a beamformer stage operative to generate a frame of acoustic signals on an initial sample grid, and a display characterized by a pixel parameter. Acoustic signals on the initial sample grid are converted to processed acoustic signals on a modified sample grid prior to scan conversion. The modified sample grid is controlled as a function of the pixel parameter of the display to reduce image artifacts and maximize the detail with which the image is displayed.

18 Claims, 11 Drawing Sheets

FOREIGN PATENT DOCUMENTS

| | | |
|---|---|---|
| 2-194496 | 8/1990 | Japan . |
| 3-9738 | 1/1991 | Japan . |
| 3-178644 | 8/1991 | Japan . |
| 4-90748 | 3/1992 | Japan . |
| 4-174658 | 6/1992 | Japan . |
| 6-30930 | 2/1994 | Japan . |
| 6-103364 | 4/1994 | Japan . |
| 2 157 828 | 10/1985 | United Kingdom . |
| 2 177 208 | 1/1987 | United Kingdom . |
| 2 194 149 | 3/1988 | United Kingdom . |
| WO 92/10135 | 6/1992 | WIPO . |

OTHER PUBLICATIONS

M. Graca Ruano, et al.—Cost/Benefit Criterion for Selection of Pulsed Doppler Ultrasound Spectral Mean Frequency and Bandwidth Estimators, *IEEE Transactions on Biomedical Eng'g.*, vol. 40, No. 12, 1993.

Ronald H. Silverman, PhD., et al.—The Effect of Transducer Bandwidth on Ultrasonic Image Characteristics, *Retina*, vol. 15, No. 1, 1995.

Robin D. Willink, et al.—The Effect of Noise and High–Pass Filtering on the Estimation of Mean Blood Velocity Using Wide and Narrow Ultrasound Beams, *IEEE Transactions on Biomedical Eng'g.*, vol. 43, No. 3, 1996.

Christopher C. Kuni, "Introduction To Computers & Digital Processing In Medical Imaging", Library Of Congress Cataloging–In–Publication Data, pp. 69–71 (1988).

Christopher C. Kuni, "Introduction To Computers & Digital Processing In Medical Imaging" Year Book Medical Publishers, Inc., pp. 112–122 (1988).

B. Earl Henderson, "PC Based X–Ray Imaging System", SPIE vol. 914 Medical Imaging II (1988), pp. 1232–1237.

John D. Austin and Tim Van Hook, "Medical Image Processing On An Enhanced Workstation", SPIE vol. 914 Medical Imaging II (1988), pp. 1317–1324.

Bruno Richard, Jean–Claude Roucayrol and Jean Perrin, "A New Digital Scan Processor For Ultrasonic Imaging" Acoustical Imaging, International Symposium, vol. 15, pp. 227–238 (1987).

P.N.T. Wells, "The Present Status Of Ultrasonic Imaging In Medicine", Ultrasonics, vol. 31, No. 5 (1993), pp. 345–352.

F. O. Huck, S. K. Park, D. E. Speray, "Information Density And Efficiency Of Two–Dimensional (2–D) Sampled Imagery", SPIE vol. 310 Image Quality (1981), pp. 36–42.

Jonathan Ophir, Nabil F. Maklad, "Digital Scan Converters In Diagnostic Ultrasound Imaging", Proceedings Of The IEEE, vol. 67, No. 4, Apr. 1979, pp. 654–664.

*Ultrasonic Sensors: From Research to Applications*, Valentin Magori, Siemens Review, R&D Special, Spring 1994.

*Diagnostic Ultrasound System, SSA–100A*, Takahisa Okazaki et al. (1987).

*Whole Body CT Scanner, TCT–300*, Akira Inoue et al. (1987).

*Technological Trends of Ultrasound Diagnostic Systems*, Isao Baba et al. (1987).

*Image Processing Techniques in Nuclear Medicine*, Susumu Matsui et al. (1987).

Toshiba *SSA–380A*, K. Okubo et al., 1994 vol. 49 No. 2.

Toshiba *Dual–Head Digital Gamma Camera*, T. Yamakawa, 1994 vol. 49 No. 2.

Toshiba *SSA–340A*, H. Nakajima, 1994 vol. 49 No. 8.

Toshiba *64–bit RISC Processor, TC86R4600, and Peripheral Chip Sets*, A. Wada et al. 1994 vol. 49 No. 8.

*An Image Display Algorithm For In Real–Time Sector Scanners With Digital Scan Converters* , H.G. Larsen et al., 1980 Ultrasonics Symposium Proceedings, vol. 2, pp. 763–765.

*Acuson 128XP/10c Computed Sonography System Cardiovascular Applications.* Jun. 1992.

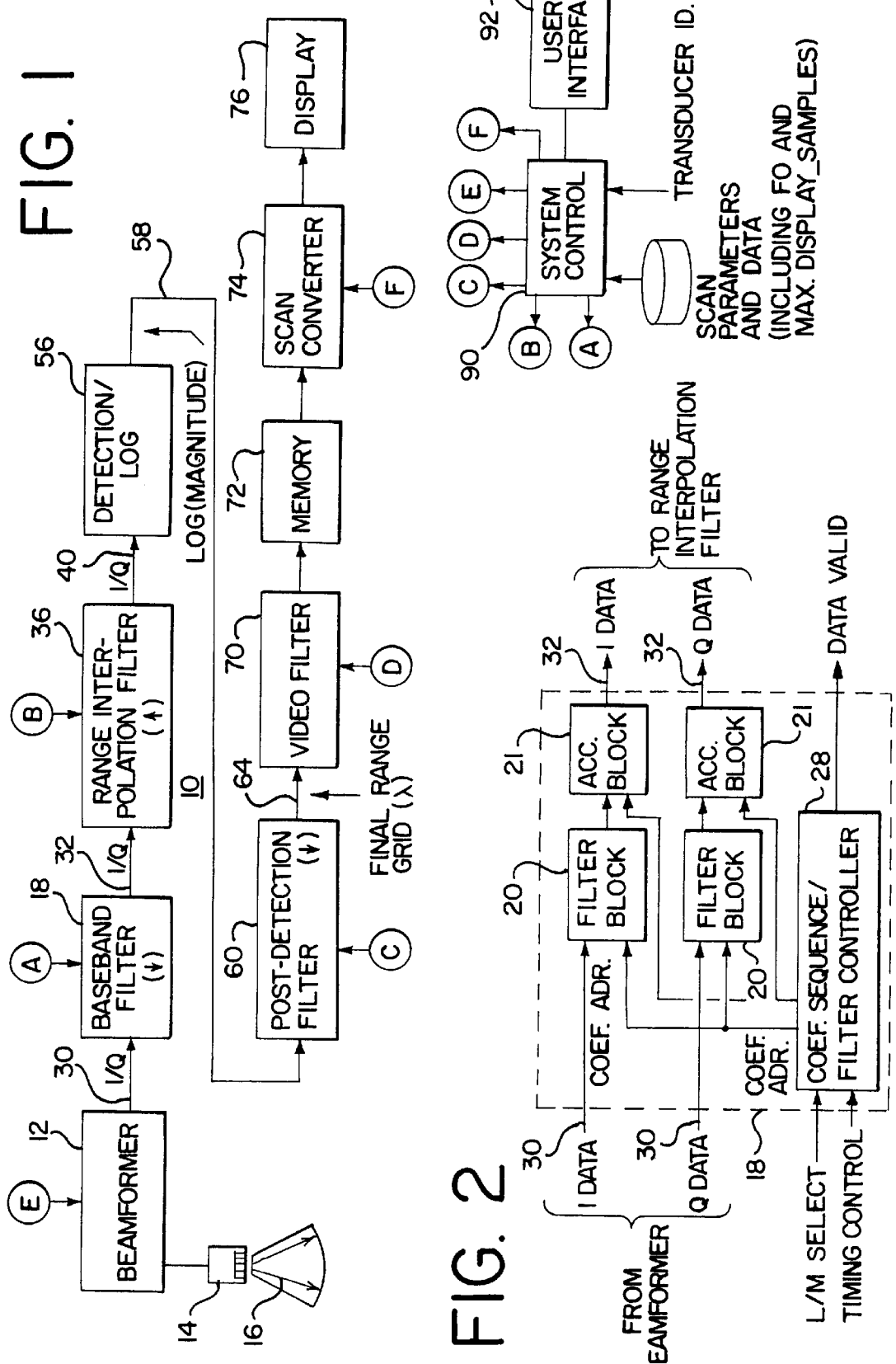

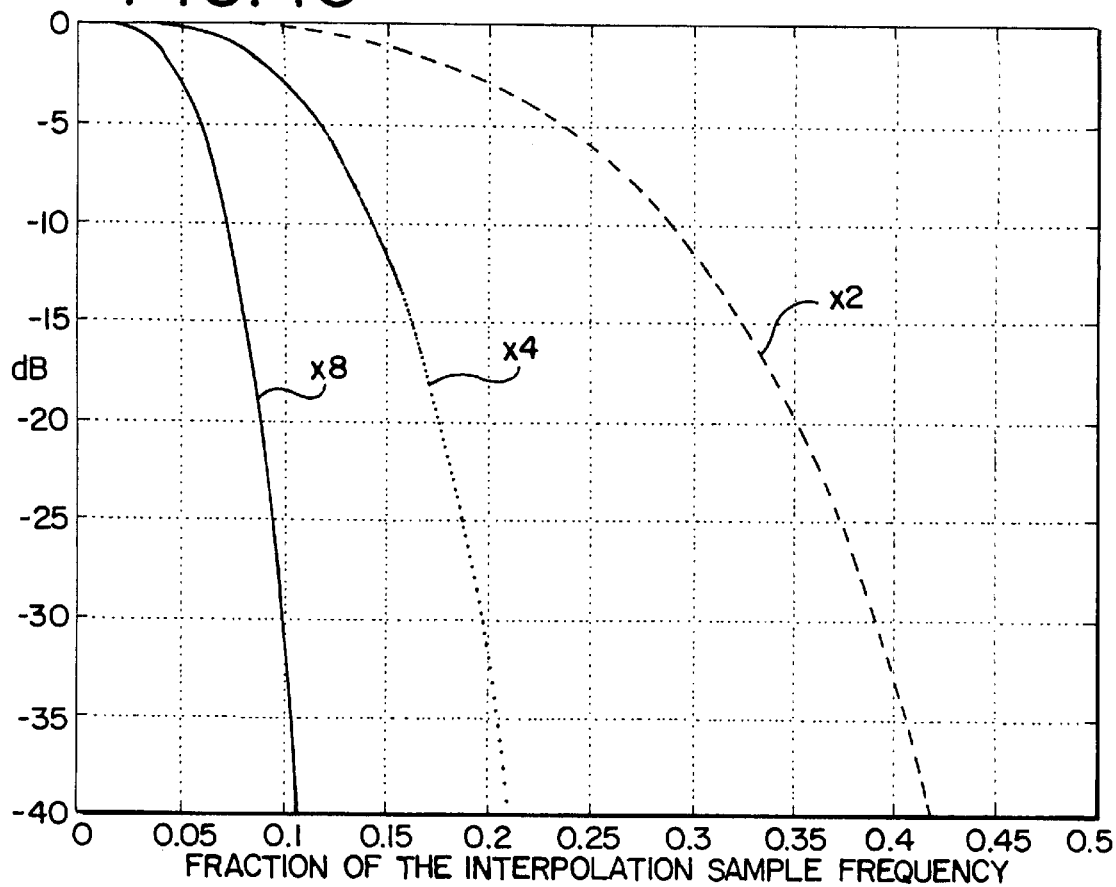
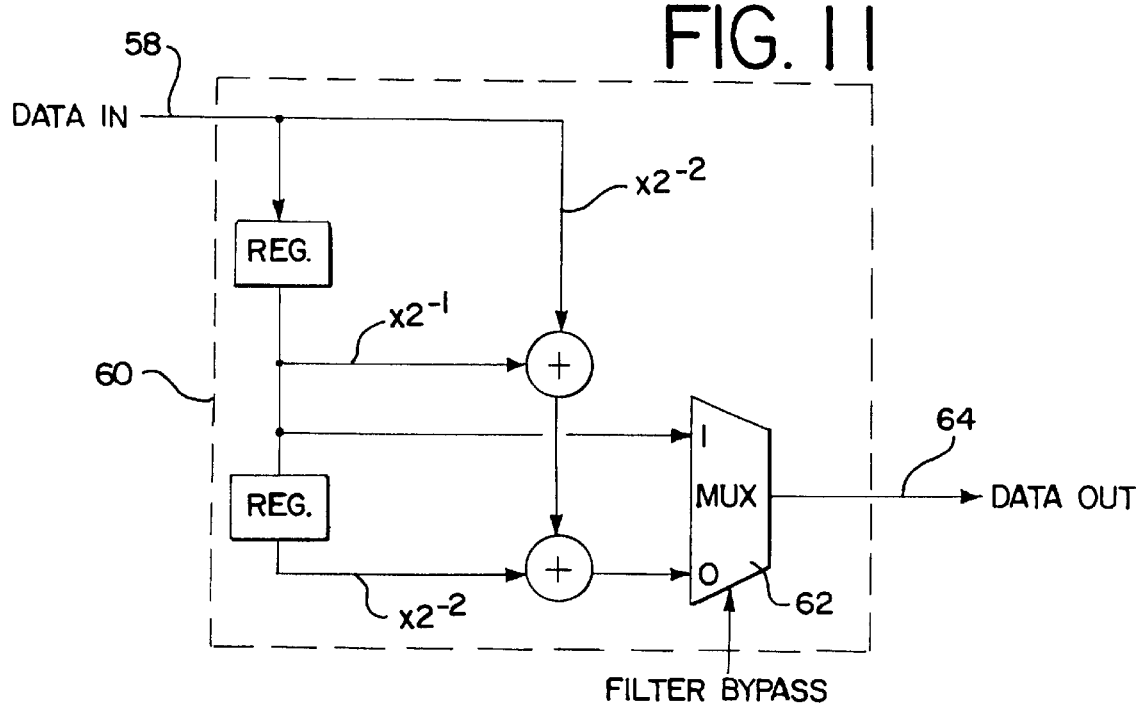

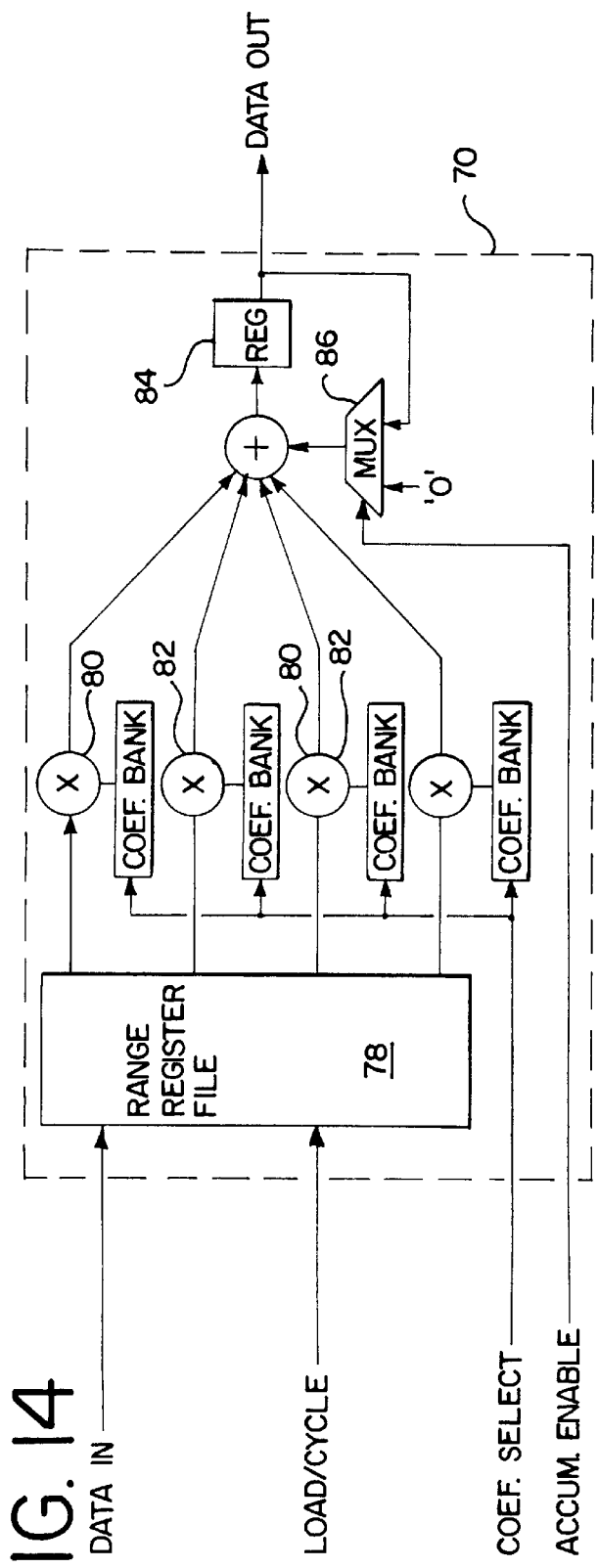
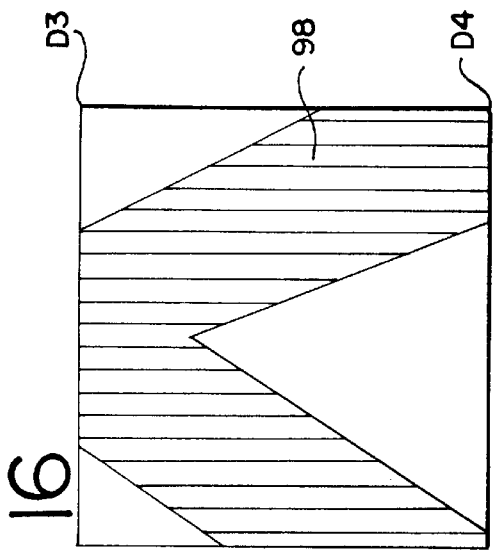
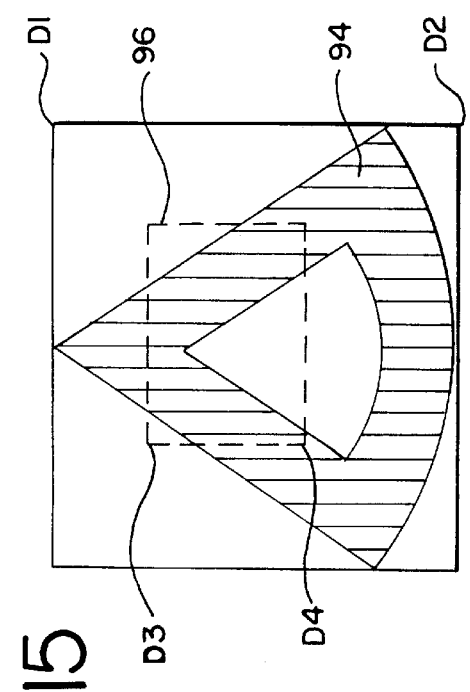

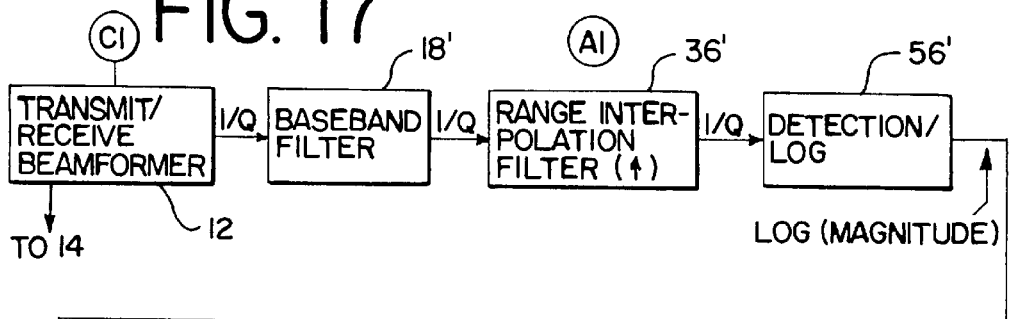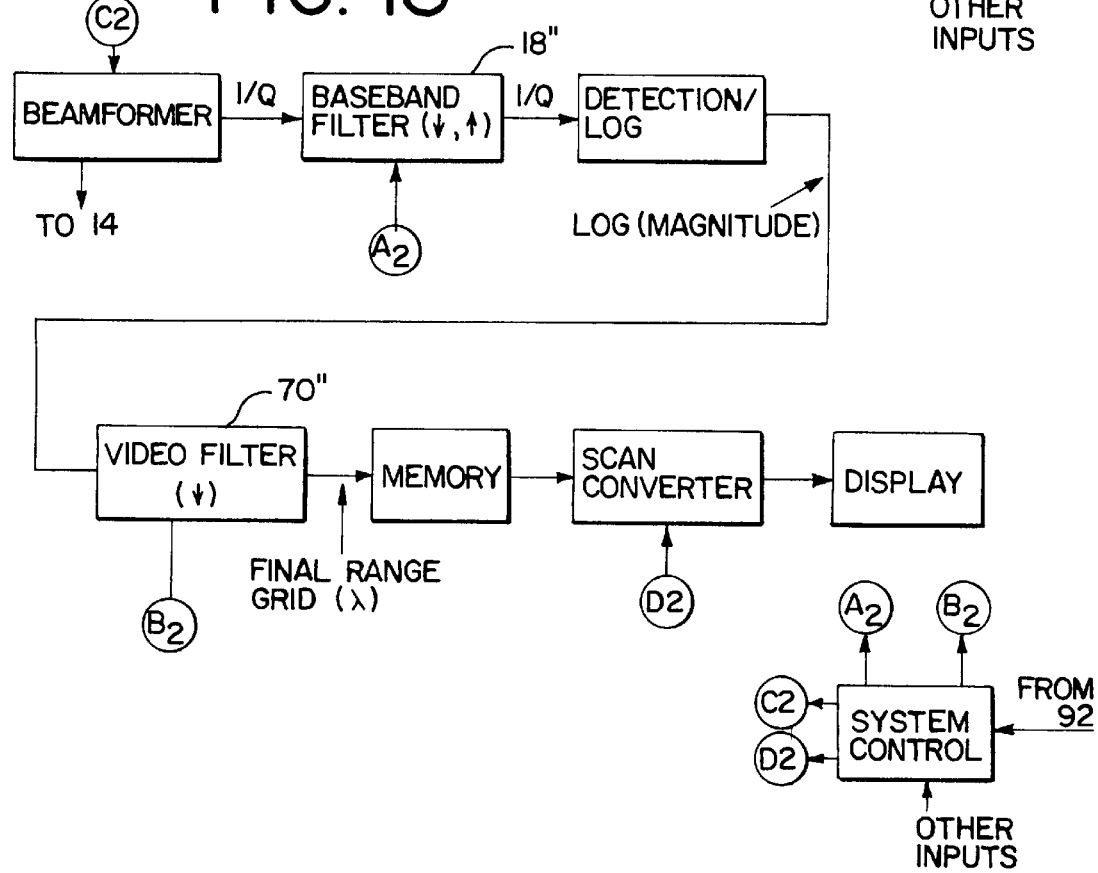

ULTRASONIC DIAGNOSTIC IMAGING SYSTEM WITH PROGRAMMABLE ACOUSTIC SIGNAL PROCESSOR

BACKGROUND OF THE INVENTION

This invention relates to an improved ultrasonic diagnostic imaging system that reduces image artifacts and maximizes the detail with which images are displayed.

Conventional ultrasonic diagnostic imaging systems include various image enlargement capabilities which allow a user to enlarge a selected portion of an image displayed in real time. As a portion of an image is enlarged, a greater number of video lines or pixels are available on the display device for the display of the enlarged portion of the image.

The present invention is directed to an improved system that reduces image artifacts and maximizes the amount of information in a displayed image, for both full size and enlarged images.

SUMMARY OF THE INVENTION

This invention relates to improvements to an ultrasonic imaging system of the type comprising a beamformer stage operative to generate an acoustic frame of acoustic signals on an initial sample grid, and a display characterized by a pixel parameter. According to one aspect of this invention, means are provided for converting the acoustic signals on the initial sample grid to processed acoustic signals on a modified sample grid prior to scan conversion. The converting means is controlled to vary the modified sample grid as a function of the pixel parameter.

According to another aspect of this invention, an ultrasonic imaging system of the type described above is provided with at least one variable decimator responsive to the acoustic signals to generate processed acoustic signals on a modified sample grid prior to scan conversion. This modified sample grid has a reduced number of samples in at least one dimension as compared to the initial sample grid. The decimator is controlled to vary the modified sample grid as a function of the pixel parameter.

According to another aspect of this invention, a method is provided for controlling signal bandwidth in an ultrasonic diagnostic imaging system of the type comprising a beamformer stage operative to generate a series of acoustic signals, a detector stage responsive to the acoustic signals to generate detected signals, and a scan converter responsive to the detected signals. This method comprises the step of selectively increasing the sampling rate of the acoustic signals prior to detection of the acoustic signals in the detection stage to reduce aliasing artifacts introduced by the detection stage. The method further includes the step of selectively reducing bandwidth of the detected signal prior to scan conversion.

Other aspects of this invention relate to varying the filter responses of range and azimuthal filters in accordance with position within an image frame, as set out in the following claims.

BRIEF DESCRIPTION OF THE DRAWINGS

FIG. 1 is a block diagram of a preferred embodiment of the present invention.

FIG. 2 is a block diagram of the baseband filter of FIG. 1.

FIG. 10 is a graph showing the frequency responses of the range interpolation filter of FIG. 6.

FIG. 11 is a block diagram of the post-detection filter of FIG. 1.

FIG. 14 is a block diagram of a first embodiment of the video filter of FIG. 1.

FIGS. 15 and 16 are a schematic diagrams of two displays presented on the display of FIG. 1.

FIG. 17 is a block diagram of a second preferred embodiment of the present invention.

FIG. 18 is a block diagram of a third preferred embodiment of the present invention.

DETAILED DESCRIPTION OF THE PRESENTLY PREFERRED EMBODIMENTS

Figure 3:
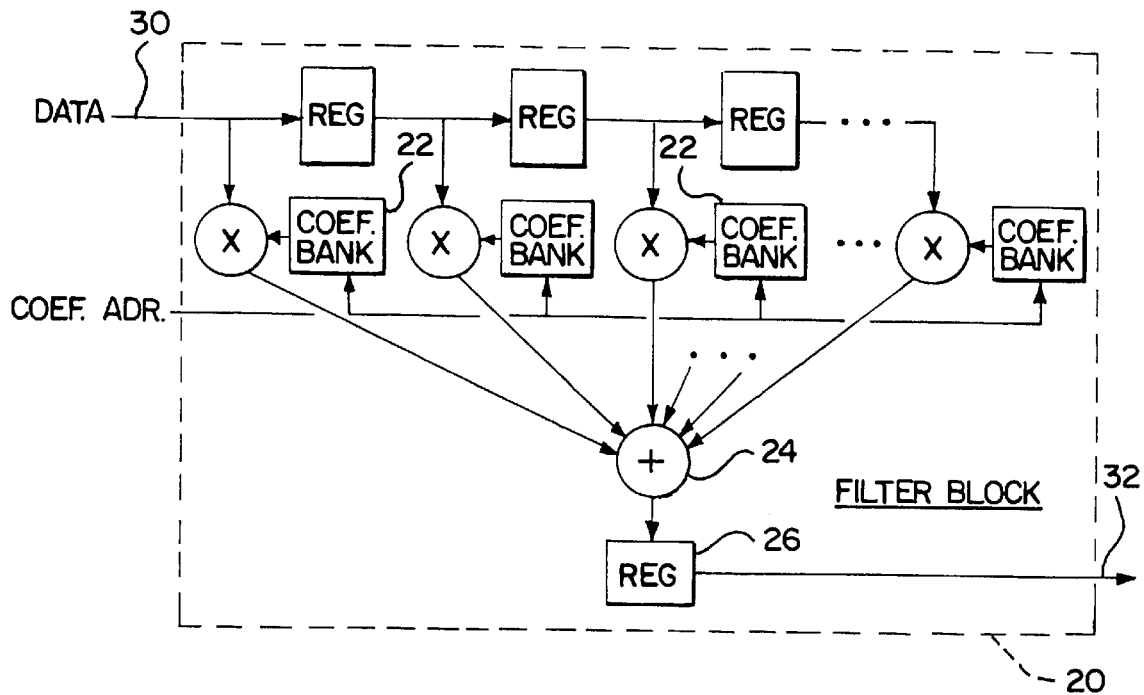
FIG. 3 is a block diagram of one of the filter blocks of FIG. 2.

Turning now to the drawings, FIG. 1 shows a block diagram of an ultrasonic diagnostic imaging system 10 that includes a presently preferred embodiment of this invention. The imaging system 10 includes a beamformer stage 12 that includes transmit and receive beamformers. The present invention can be adapted to the widest range of beamformers, including both analog and digital beamformers, See Hedberg U.S. Pat. No. 5,396,285 for a discussion of an analog beamformer method.

The beamformer stage 12 is connected in the conventional manner to an ultrasonic transducer array 14. Under control of the transmit beamformer of the beamformer stage 12, the transducer array 14 transmits ultrasonic signals along scan lines 16 into the tissue of interest. Returning ultrasonic signals from the tissue are sensed by the transducer array 14 and supplied to the receive beamformer in the beamformer stage 12. The receive beamformer coherently sums ultrasonic echo information from the individual transducers of the transducer array 14 and generates a sequence of complex baseband signals associated with each of the scan lines 16.

These complex baseband signals are sampled in range (i.e., distance along the scan line 16) on an initial range grid. As used herein, the term "range grid" defines the spacing between adjacent samples on a receive scan line. Preferably, this spacing is specified relative to the wavelength $\lambda_0$ of the center operating frequency $F_0$ of the system. For example, when the initial range grid has a value of 0.25, the spacing between adjacent samples supplied by the beamformer stage 12 is $(0.25)(\lambda_0)$. The initial range grid may vary with differing operating parameters of the beamformer stage 12, such as the center operating frequency $F_0$ and the mode of operation (single or dual beam).

Complex baseband signals sampled on the initial range grid are supplied as input data to a baseband filter 18. In general, the baseband filter 18 performs harmonic and noise suppression filtering in the range dimension on the complex baseband signals from the beamformer stage 12, and provides selectable sampling rate decimation in range by a factor of L/M. In this embodiment L/M is constrained to one of the following values:

$L/M = \{1, 4/5, 2/3, 4/7, 1/2, 2/5, 1/3, 2/7, 1/4, 1/5, 1/6\}$.

Preferably, the bandwidth of the baseband filter 18 is adjusted as a function of the selected ratio L/M to band limit the signal prior to decimation and to prevent aliasing, as is well known in the art.

FIGS. 2 through 5 provide further details regarding the presently preferred baseband filter 18. As shown in FIG. 2, the baseband filter 18 includes two separate filter blocks 20 which operate concurrently and independently on the I and Q components of the complex baseband signal 30 from the beamformer stage 12 Each of the filter blocks 20 preferably takes the form shown in FIG. 3. The baseband filter 18 uses real coefficient values, and corresponding locations in the coefficient banks 22 of the two filter blocks are therefore preferably loaded with the same values.

In the preferred embodiment the filter block 20 is a sixteen-tap, real-coefficient FIR filter, which can be built for example with commercially available components, such as the Harris Semiconductor HSP43168 dual FIR filter integrated circuit. In general, consecutive input samples in range are weighted by corresponding coefficients stored in coefficient banks 22. The weighted input samples are then summed in a summer 24 to generate an output signal stored in a register 26. The specific coefficient set in use at any given time is determined by the factor L/M, under control of the controller 28 of the FIG. 2.

The maximum number of input samples that can be weighted in the preferred embodiment is 16, with all of the weighted samples summed to generate the output sample. Coefficients within a coefficient set may be set to either zero or non-zero values. The coefficient banks 22 in the filter block 20 can be preloaded by a microprocessor with the coefficient sets appropriate for a given operating mode of the system. These coefficient sets are typically precomputed and stored in system memory, with each set varying in an appropriate manner as a function of specific system settings, such as L/M decimation factor, system center frequency $F_0$, specific transducer, scan format, and the like. If desired, the coefficient sets can be dynamically computed and loaded into the filter block 20 for the appropriate mode of operation, range, or azimuth locations within the frame.

Figure 3A:
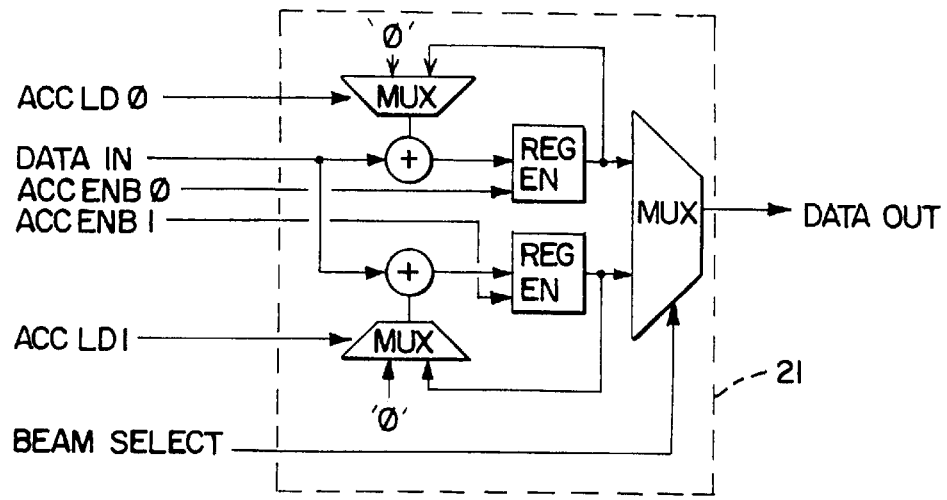
FIG. 3A is a block diagram of one of the accumulator blocks of FIG. 2.

The output of the filter block 20 is applied to an accumulator block 21 (FIG. 3A). The baseband filter 18 employs multiple passes to effect a 16 tap filter, accumulating the results between passes in the accumulator block 21. Additionally the baseband filter 18 processes dual beam data in a beam interleaved manner, and the accumulator blocks 21 independently accumulate results for each beam. The data output from the accumulator blocks 18 is beam interleaved between the outputs of the two accumulators.

The controller 28 sequences through the preloaded coefficients in the coefficient banks 22 to effect the desired change in the sampling rate by the factor L/M.

Figure 4:
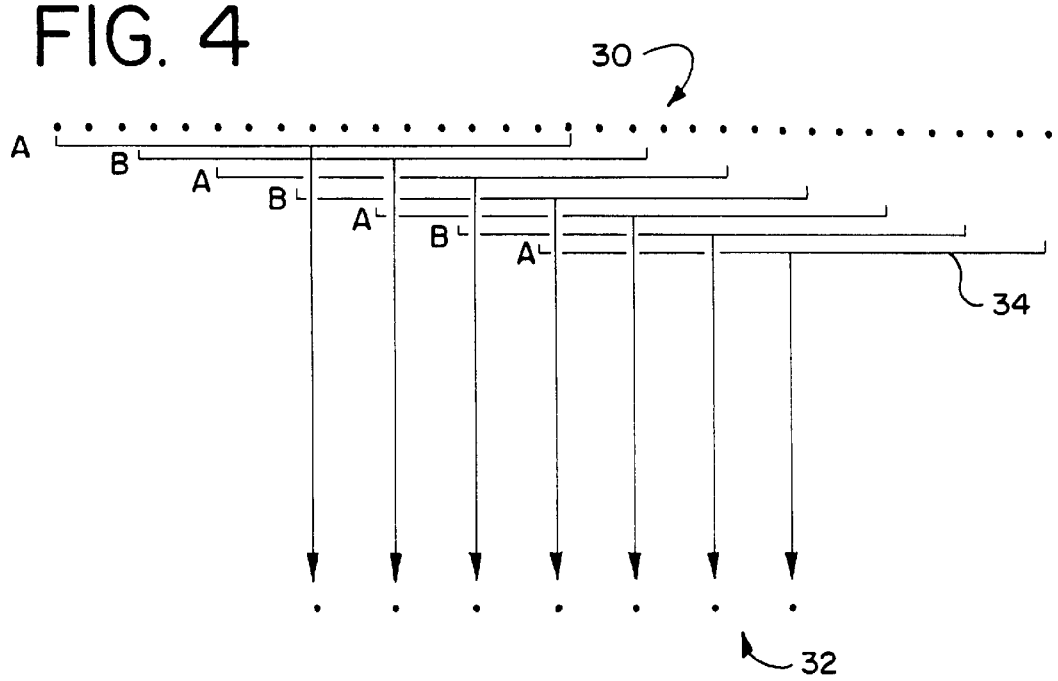
FIG. 4 is a diagram illustrating operation of the baseband filter of FIG. 2.

FIG. 4 provides information regarding the operation of the baseband filter 18 when the decimation factor L/M is equal to 2/5. In FIG. 4 the input sample sequence to the baseband filter 18 (sampled at the initial range grid) is shown at 30, and the output sample sequence from the baseband filter 18 is shown at 32. The brackets 34 indicate the subset of the input samples that are weighted and summed to produce a respective output sample, and the letters A, B identify the coefficient set that is used for weighting the input samples 30 for each respective bracket 34. The number of coefficient sets used for a given factor L/M is determined by L. In FIG. 4, when an output sample is coaligned with an input sample, the coefficient weights employed on one or both end samples are zero.

Figure 5:
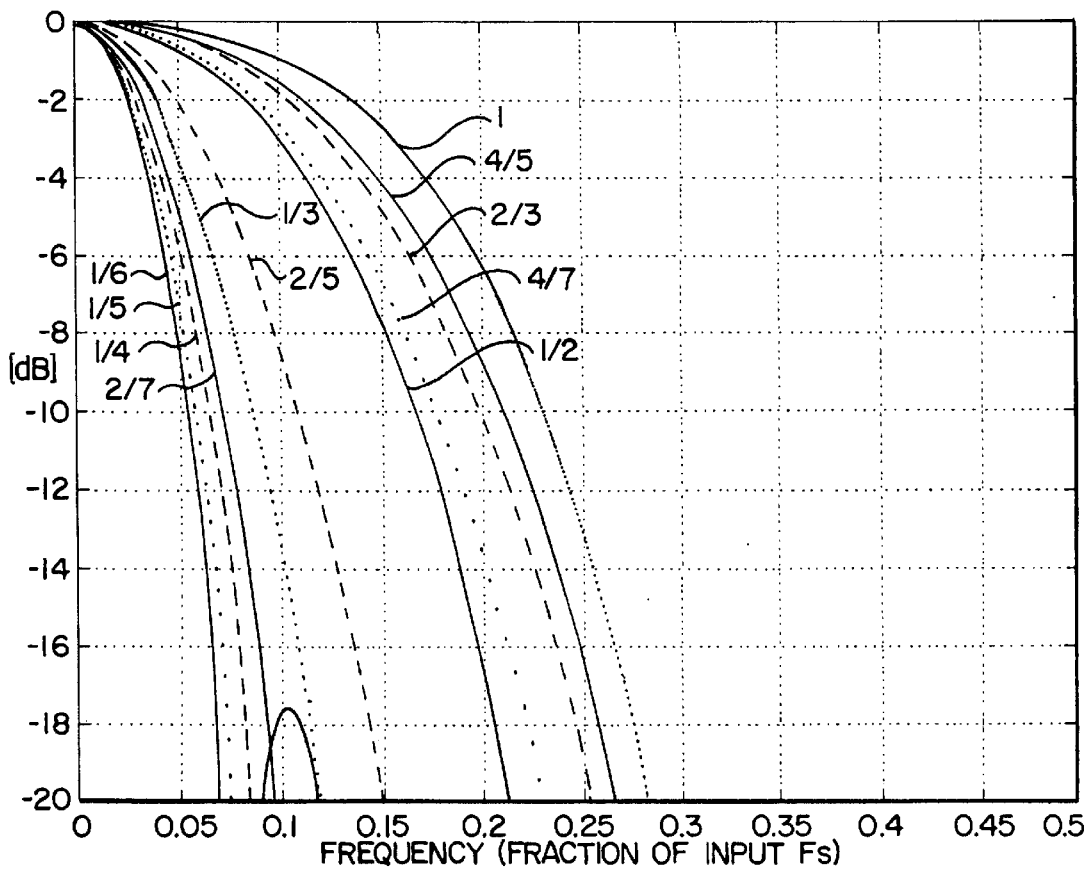
FIG. 5 is a graph showing the frequency responses of the baseband filter of FIG. 2.

FIG. 5 shows exemplary frequency responses for the baseband filter 18 for various values of the decimation factor L/M. Note that smaller values of the decimation factor L/M are associated with narrower frequency responses for the baseband filter 18, thereby causing the baseband filter 18 to limit the bandwidth of the input samples 30. In this way, aliasing artifacts are eliminated as the sequence of input samples 30 is decimated. The process of effecting a sample rate change is well known in the art, and is described in detail by R. E. Crochiere and L. R. Rabiner in *Multirate Digital Signal Processing*, Prentice Hall, 1983. U.S. patent application Ser. No. 08/434,160, assigned to the assignee of the present invention and entitled "Method and Apparatus for a Baseband Processor of a Receive Beamformer System", discloses a baseband filter that is programmable such that the sample rate in range can be changed by an adjustable factor L/M.

In alternative embodiments, the baseband filter 18 may employ complex coefficients as well as complex samples, or any combination of real and complex samples and coefficients. Still other embodiments may employ IIR or nonlinear filtering functions to perform filtering and L/M sample rate conversion.

Returning to FIG. 1, the baseband filter 18 supplies band limited and resampled complex baseband data to a range interpolation filter 36. The range interpolation filter performs up-sampling in range on the output samples 32 prior to nonlinear detection and log processing. The range filter 36 performs up-sampling by a factor of R/S, where R/S is constrained in the preferred embodiment to one of the following values:

$R/S = \{1, 8/7, 4/3, 8/5, 2, 8/3, 4\}$.

The decimation factor L/M and the interpolation factor R/S are preferably selected as described below as a function of a number of parameters. In this embodiment, decimation by the baseband filter 18 (L/M<1) is never employed in conjunction with range interpolation by the range interpolation filter 36 (R/S>1). In alternative embodiments, the baseband filter 18 and range filter 36 may be combined into a common block which implements both the L/M and the R/S resampling selections.

Figure 6:
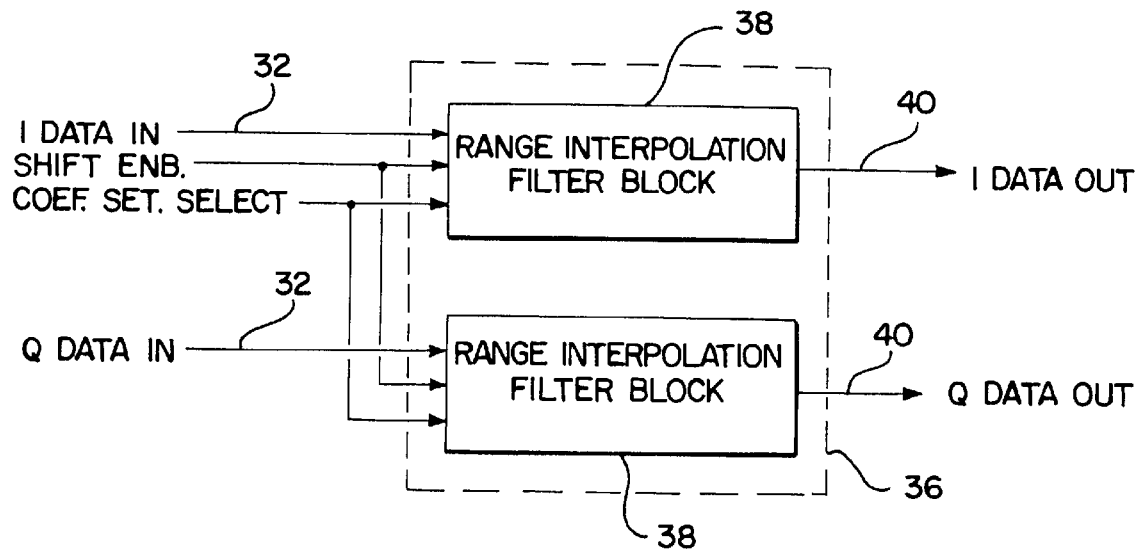
FIG. 6 is a block diagram of the range interpolation filter of FIG. 1.
Figure 7:
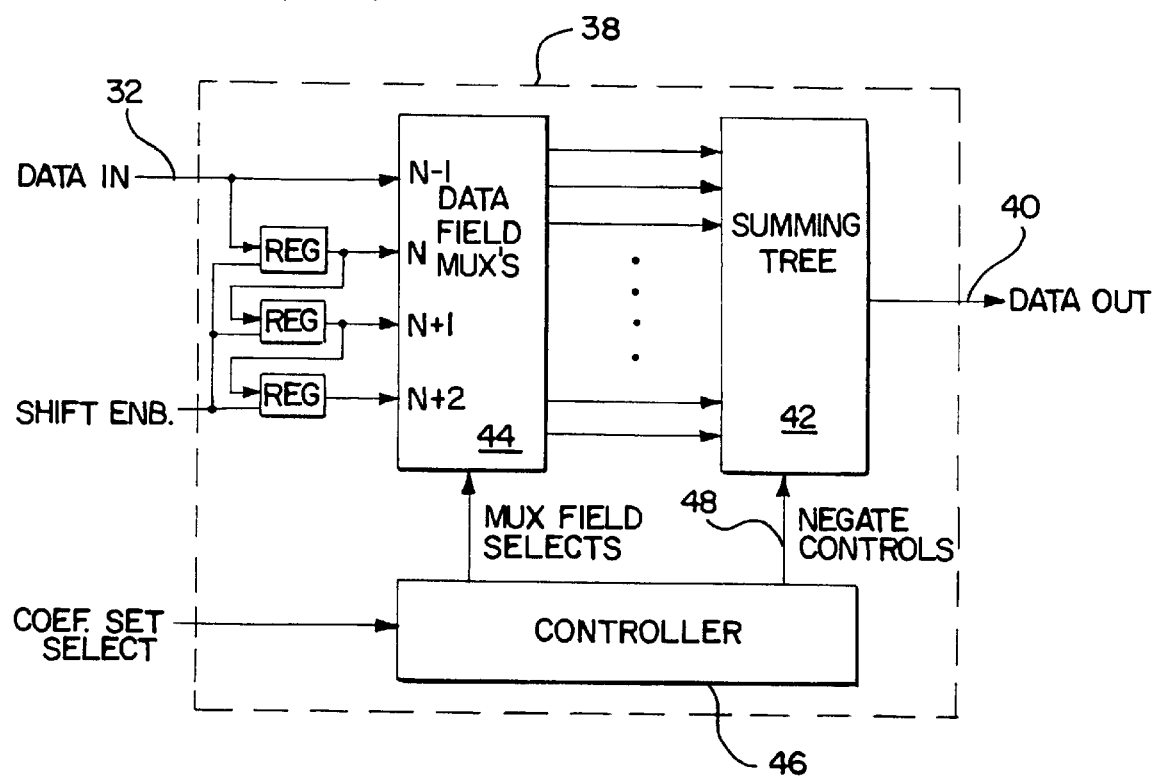
FIG. 7 is a block diagram of one of the range interpolation filter blocks of FIG. 6.

FIGS. 6 through 10 provide further information regarding preferred embodiments of the range interpolation filter 36. As shown in FIG. 6, the range interpolation filter 36 includes two filter blocks 38, one for each of the I and Q output samples 32 from the baseband filter 18. As shown in FIG. 7, each filter block 38 preferably operates on four consecutive baseband filter output samples 32, either the I or Q component of the complex baseband data. The samples 32 are weighted by a selected set of corresponding coefficient values and then summed to generate output samples 40.

The preferred embodiment shown in FIG. 7 implements the weighting operation by shifting each sample 32 by the set of binary powers ($2^n$, $2^m$ . . . ) that sum to the desired coefficient value, and summing all shifted and scaled values in a summing tree 42. This embodiment provides a more optimal implementation in cases where the desired coefficient values can be expressed as the sum of only a few binary powers. For example, to weight a sample 32 by a coefficient value of 0.515625, the coefficient value can be first expressed as the sum of a set of binary powers:

$$0.515625 = 2^{-1} + 2^{-6}.$$

Then the weighted sample 32 ($I_n$ in the following equation) can be expressed as follows:

$$I_n \times 0.515625 = [I_n \times 2^{-1} + I_n \times 2^{-6}].$$

The weighted sample $I_n$ can be generated by summing the sample $I_n$ shifted right by one binary position with the sample $I_n$ shifted right by six binary positions. In the preferred embodiment of FIG. 7, four consecutive samples 32 in range are input into a set of data field multiplexers 44 which generate a set of samples shifted by a corresponding set of binary powers. The shifts performed by the data field multiplexers 44 are selected in correspondence with the specific coefficient set selected by the coefficient set controller 46. All of the shifted samples generated by the data field multiplexers 44 are supplied as inputs to the summing tree 42, which sums all values to generate the respective output sample 40.

The summing tree 42 may also form the two's complement value of one or more of the shifted samples based on the negate control signals 48 supplied by the controller 46. Forming the two's complement of a binary value will change the sign of the value, as is well known in the art. This approach may be used to generate negative coefficient values, which may be useful in forming a reduced set of binary powers adequate to express a given coefficient.

Figure 8:
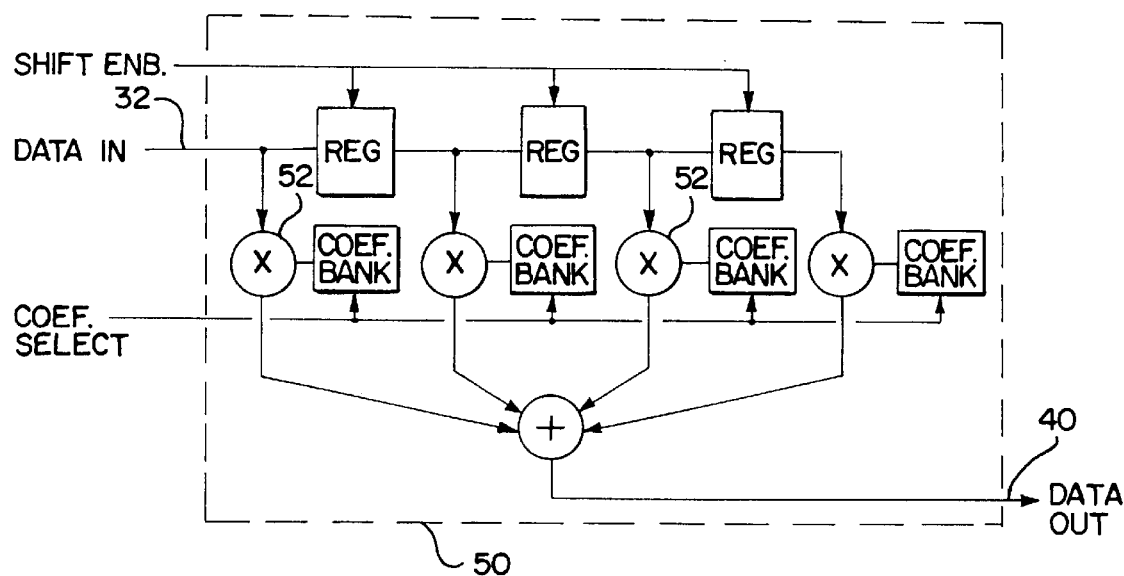
FIG. 8 is block diagram of an alternative range interpolation filter block.

The filter block 38 can take alternative forms, as shown for example in FIG. 8. In the alternative filter block 50 samples 32 are weighted or multiplied by corresponding coefficients with multipliers 52. Such a filter can be built with commercially available components such as the Harris Semiconductor HSP 43168 dual FIR filter integrated circuit.

The range interpolation filter 36 preferably employs real rather than complex coefficient values. In alternative embodiments, the range filter 36 may employ complex coefficients as well as complex samples, or any combination of real and complex samples and coefficients. Still other embodiments may employ IIR or nonlinear filtering functions to perform filtering and R/S sample rate conversion.

Figure 9:
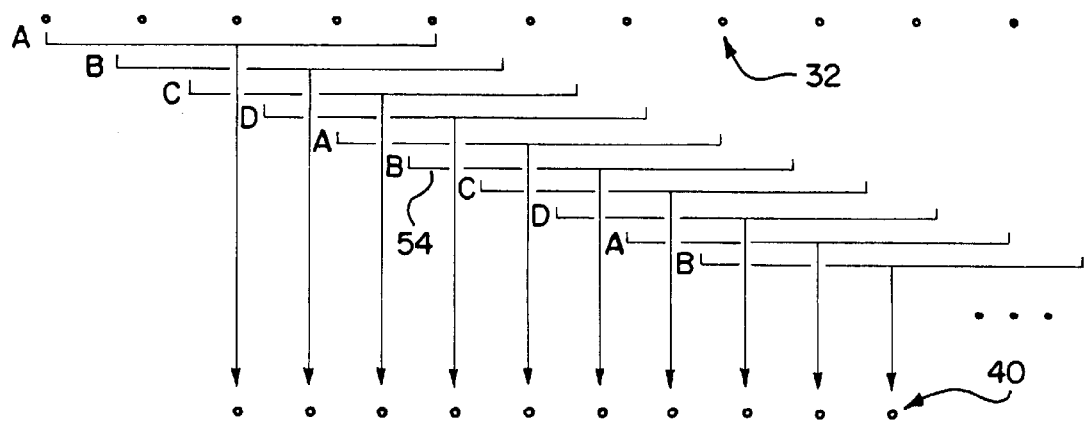
FIG. 9 is a diagram illustrating operation of the filter block of FIG. 7.

FIG. 9 illustrates operation of the range interpolation filter 36 for the exemplary case where the factor R/S is equal to ⅓. In FIG. 9, the sequence of samples 32 supplied as inputs to the range interpolation filter 36 are shown at the top of the figure, and the sequence of output samples 40 generated by the range filter are shown at the bottom of the figure. The brackets 54 define the sequence of samples 32 that are filtered to create individual output samples 40, and the letters A through D identify the coefficient set used for each weighting operation. The number of coefficient sets required for a given factor R/S is determined by R. In FIG. 9, when an output sample 40 is coaligned with a sample 32, the coefficient weights employed on one or both end samples are zero.

FIG. 10 shows exemplary frequency responses for the range interpolation filter 36 for various values of the interpolation factor R. With larger interpolation factors R, the frequency response of the filter becomes narrower relative to the interpolation sample frequency, thereby limiting the bandwidth of the samples 32 and filtering out images of the spectrum that repeat at harmonics of the original sampling frequency. The process of effecting a sample rate change is well known in the art, and is described, for example, in the above-identified text *Multirate Digital Signal Processing*.

Returning to FIG. 1, the output samples 40 generated by the range interpolation filter 36 are supplied to a detection stage 56, which performs magnitude detection and log compression on each data sample. The data samples 40 supplied by the range interpolation filter 36 are on an intermediate range grid, which is equal to the initial range grid of the beamformer stage 12 modified by the factor (L/M)×(R/S). The detection stage 56 generates log (magnitude) samples 58 which are supplied to a post-detection filter 60. The post-detection filter 60 performs sample rate decimation by a factor of 1 (no decimation) or ½. When decimation by ½ is selected, filtering or band limiting of the magnitude samples is performed prior to decimation to a final range grid. This is done to substantially prevent aliasing.

The intermediate range grid on which data is supplied to the detection stage is preferably sufficiently fine (sampled at a high enough rate) to prevent aliasing due to spectral broadening which occurs through the nonlinear processing operations performed in the detection stage 56. The range grid required prior to nonlinear processing to prevent aliasing will be dependent on the overall bandwidth of the signal from the beamformer stage 12 and the frequency response employed in the baseband filter 18. In general, as the final range grid value increases as described below, it is preferable to employ an intermediate range grid that is finer than the final range grid (more highly over sampled) and then to band limit and decimate down to the final range grid after nonlinear processing in the detection stage 56, to preserve information content and to prevent aliasing artifacts. For smaller values of the final range grid, the final range grid may be fine enough to sufficiently over sample the signal prior to nonlinear processing, in this way avoiding the need for increased over-sampling prior to nonlinear processing and subsequent band limiting and decimation after nonlinear processing.

Figure 12:
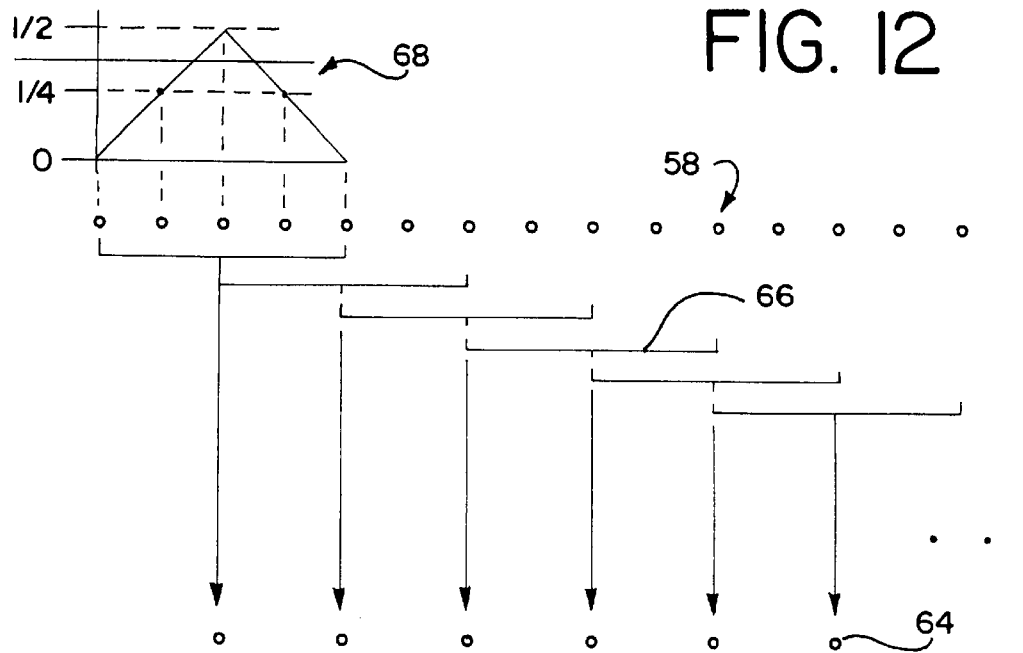
FIG. 12 is a diagram illustrating operation of the post-detection filter of FIG. 11.
Figure 13:
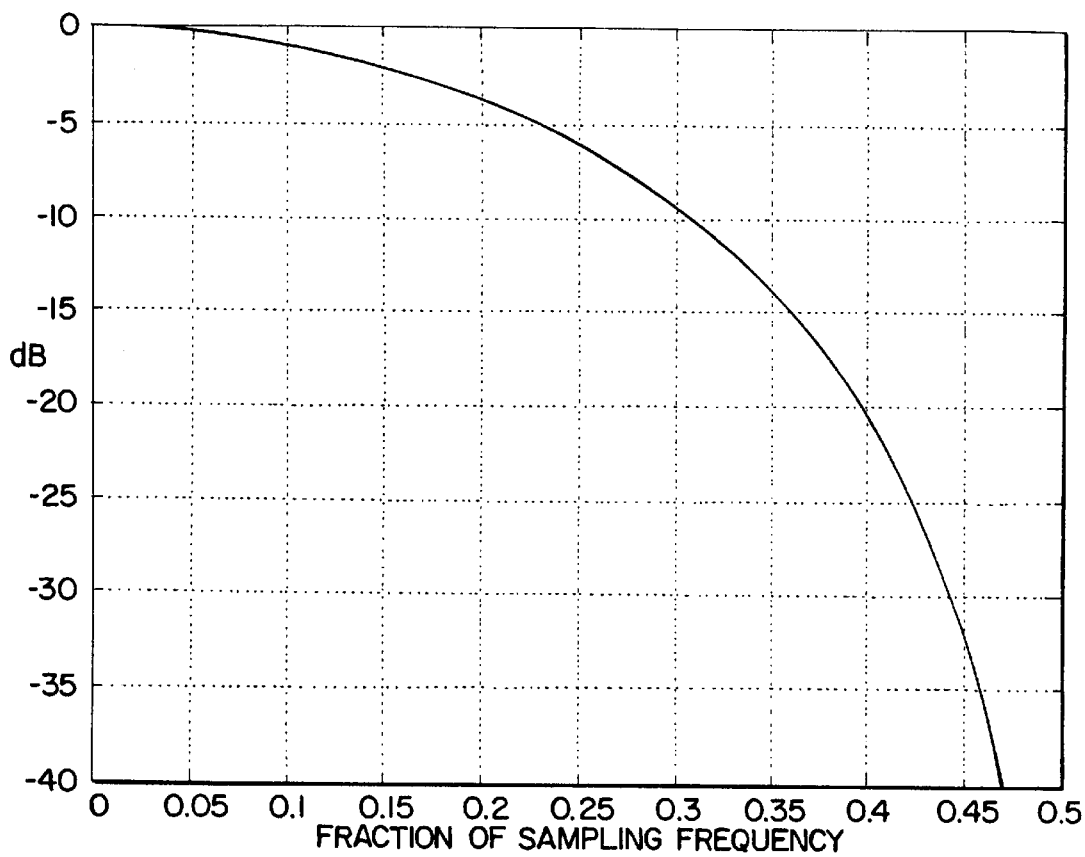
FIG. 13 is a graph showing the frequency response of the post-detection filter of FIG. 11.

FIGS. 11 through 13 provide further details regarding the preferred embodiment of the post-detection filter 60. The post-detection filter 60 is bypassed when decimation by a factor of 1 is selected (i.e., no decimation). The post-detection filter 60 performs filtering of the log (magnitude) samples 58 in range prior to decimation to prevent aliasing artifacts when decimation by a factor of ½ is selected. The preferred embodiment of FIG. 11 includes a three tap filter with fixed coefficient weights (0.25, 0.50, 0.25). Weighting of the log (magnitude) samples 58 is effected by shifting the data prior to summation. The multiplexed 62 allows filtered or unfiltered data to be used for the output signals 64. The post-detection filter 60 may be implemented in ASIC technology or with commercially available components. Other embodiments for this filter may include a different number of taps or may include IIR or nonlinear filter structures.

FIG. 12 shows an example of operation of the post-detection filter 60 when the decimation filter factor ½ is selected. The input log (magnitude) samples 58 are shown at the top of the figure, and the output signals 64 are shown at the bottom of the figure. Brackets 66 are used to identify the magnitude samples 58 that are weighted and summed to form respective ones of the output samples 64. In each case, the coefficient set is as shown at 68. In FIG. 12 both end samples in the set of samples 58 are weighted with a coefficient value of zero.

FIG. 13 shows the frequency response for the preferred embodiment of the post-detection filter 60 when decimating by the factor ½.

Returning to FIG. 1, output samples 64 from the post-detection filter 60 are sampled on the final range grid, and are supplied to a video filter 70. The video filter 70 performs final shaping of the spectrum of the signal prior to scan conversion and display. The video filter 70 is programmable, and may be set to pass-through mode where no filtering operation is performed, or may be employed to perform further band limiting or band peaking (edge enhancement) on the range data.

In alternative embodiments shown in FIGS. 17 and 18, the post-detection filter 60 and the video filter 70 can be combined into a single stage that performs variable band limiting based on the selected decimation factor and subsequent decimation to the final range grid.

FIG. 14 provides further information regarding the presently preferred embodiment of the video filter 70. In this embodiment the video filter 70 does not resample the data to another range grid, but in alternative embodiments the video filter 70 can be employed with or without the post-detection filter 60 to effect a change in the sampling rate.

In the preferred embodiment of FIG. 14 the video filter 70 is a 16 tap FIR filter. As shown in FIG. 14, the video filter 70 can include a range register file 78 to hold sixteen consecutive samples in range, which are partitioned into four groups of four samples each. The first group of four samples is output from the register file 78 to a set of four multipliers 80, which weight the samples by corresponding coefficients selected from coefficient banks 82 by a coefficient select control. The weighted samples of the first group are summed and fed back through an output register 84 and a multiplexer 86, where the sum is subsequently accumulated with the weighted second, third and fourth groups of four samples. The coefficient select control selects a different set of coefficients corresponding to the specific group of four samples being processed at any given time. The accumulator enable control is inactive for the first group and active for the last three groups to enable the sums of the four groups of weighted samples to accumulate in the output register 84. The preferred embodiment shown in FIG. 14 employs four passes as described above in the generation of each filtered output sample to reduce the amount of hardware and the implementation cost of the tap filter 16. The filter of FIG. 14 can be implemented using ASIC technology, with commercially available components, or in a hybrid embodiment that combines elements of both approaches. Other embodiments of this filter may include a different number of taps, or may include IIR or nonlinear filter structures.

Coefficients within a coefficient set may be set to either zero or nonzero values. The coefficient banks 82 may be preloaded by a microprocessor with the coefficient sets appropriate for a given operating mode of the system. The coefficient sets are typically precomputed and stored in system memory, with different sets employed depending upon specific system settings, including system center frequency $F_0$, specific transducer, scan format, and the like. Alternatively, the coefficient sets can be dynamically computed and loaded into the filter 70 for the current mode of operation.

Additionally, the video filter 70 may have a fixed frequency response for all samples in range and for all scan lines. In alternative embodiments, the frequency response of the video filter 70 may vary as a function of either or both of range and scan line (azimuth). Varying the frequency response over the image field allows for enhancement or artifact reduction in specific areas of the image field, independently of the filtering performed on other areas.

As shown in FIG. 1, the output of the video filter 70 is supplied to a conventional image memory 72, scan converter 74 and display 76, which do not require further elaboration here.

The imaging system 10 also includes a system control 90 which is coupled to a user interface 92. The system control 90 receives information from the user interface 92 that defines the desired size of the image to be presented on the display 76. The system control 90 supplies control signals to the baseband filter 18, the range interpolation filter 36, the post-detection filter 60, and the video filter 70 to generate optimally sampled data sets closely matching the fundamental display resolution over which the data sets are to be displayed.

FIGS. 15 and 16 illustrate two displays that may be selected with the user interface 92. In the display 94 of FIG. 15 the entire scanned field of view is displayed from a start depth D1 to an end depth D2. In FIG. 15 the displayed image is shown schematically for purposes of illustration, but in general the display 94 would present, for example, structural details of a tissue being imaged. A user can use the user interface 92 to select a region of interest 96. In this example the region of interest is rectangular, though in other alternatives the region of interest can take any desired shape. Note that the region of interest 96 does not extend over the full depth range D1 to D2, but instead starts at a depth D3 and extends to a depth D4.

The user interface 92 can be used to command the control system 90 to display only the region of interest, as shown in FIG. 16. In this case, the uppermost part of the image corresponds to the depth D3 and the lowermost part of the image corresponds to the depth D4. The imaged structure appears at an enlarged scale, and the region of interest 96 which filled only a portion of the display 94 now fills substantially the entire display 98. The user can toggle from the display 94 to the display 98 and back to the display 94 on command. In this example, the display device 76 is a CRT, and the displays 94 and the display 98 both fill the entire screen.

The system control 90 selects the initial range grid, the filter and decimation characteristics of the baseband filter 18, the filter and interpolation characteristics of the range interpolation filter 36, the filter and decimation characteristics of the post-detection filter 60, and the filter characteristics of the video filter 70 to optimize the resolution and to minimize the artifacts in the enlarged image 98.

In this preferred embodiment the final range grid at which samples are supplied to the video filter 70 is determined as follows. First the system control 90 computes the present value of the minimum range grid parameter MRG according to the following equation:

$$MRG = \frac{FOV \text{ (mm)} \cdot F_0 \text{ (MHz)}}{1.54 \text{ (mm/usec)} \text{MAX\_DISPLAY\_SAMPLES}} \quad \text{(Eq 1)}$$

In this equation FOV is the depth of the field of view commanded by the user interface 92. The depth of the field of view is equal to the difference between the start depth and the end depth of the displayed field of view, measured in millimeters. For example, in the display 94 the parameter FOV takes the value D2−D1, while the parameter FOV for the display 98 takes the value D4−D3. As before, $F_0$ is the center operating frequency of the system. The parameter MAX_DISPLAY_SAMPLES is an integer that defines the maximum number of samples on the final range grid to generate for a given display form and display pixel density characteristic. For example, the display 94 may occupy 400

TV lines in a particular display format, in which case MAX_DISPLAY_SAMPLES would be set to a value ≧400.

The equation set out above is used to calculate MRG, which is then used to find the final range grid selection from the appropriate range grid table corresponding to the smallest final range grid that is greater than or equal to MRG. Table 1 provides a suitable range grid table for single beam mode, and Table 2 provides a suitable range grid table for dual beam mode. These tables provide all settings of interpolation and decimation factors employed for each final range grid value.

TABLE 1

Single Beam Mode Range Grid Table

| Center Freq. Range ($F_0$-Mhz) | Beam-former Grid (λ) | Baseband Filter L/M | Range Interpolator R/S | Post-Detection Decimation | Final Range Grid (λ) |
|---|---|---|---|---|---|
| $F_{oa}$–$F_{ob}$ | .125 | 1 | 1 | 1/2 | .2500 |
| | | 4/5 | 1 | 1/2 | .3125 |
| | | 2/3 | 1 | 1/2 | .3750 |
| | | 4/7 | 1 | 1/2 | .4375 |
| | | 1/2 | 1 | 1/2 | .5000 |
| | | 2/5 | 1 | 1/2 | .6250 |
| | | 1/3 | 1 | 1/2 | .7500 |
| | | 2/7 | 1 | 1/2 | .8750 |
| | | 1/4 | 1 | 1/2 | 1.0000 |
| | | 1/5 | 1 | 1/2 | 1.2500 |
| $F_{oa}$–$F_{ob}$ | .125 | 1/6 | 1 | 1/2 | 1.5000 |
| $F_{oc}$–$F_{od}$ | .25 | 1 | 1 | 1 | .2500 |
| | | 1 | 8/5 | 1/2 | .3125 |
| | | 1 | 4/3 | 1/2 | .3750 |
| | | 1 | 8/7 | 1/2 | .4375 |
| | | 1 | 1 | 1/2 | .5000 |
| | | 4/5 | 1 | 1/2 | .6250 |
| | | 2/3 | 1 | 1/2 | .7500 |
| | | 4/7 | 1 | 1/2 | .8750 |
| | | 1/2 | 1 | 1/2 | 1.0000 |
| | | 2/5 | 1 | 1/2 | 1.2500 |
| $F_{oc}$–$F_{od}$ | .25 | 1/3 | 1 | 1/2 | 1.5000 |
| $F_{oe}$–$F_{of}$ | .50 | 1 | 2 | 1 | .2500 |
| | | 1 | 8/5 | 1 | .3125 |
| | | 1 | 4/3 | 1 | .3750 |
| | | 1 | 8/7 | 1 | .4375 |
| | | 1 | 2 | 1/2 | .5000 |
| | | 1 | 8/5 | 1/2 | .6250 |
| | | 1 | 4/3 | 1/2 | .7500 |
| | | 1 | 8/7 | 1/2 | .8750 |
| | | 1 | 1 | 1/2 | 1.0000 |
| | | 4/5 | 1 | 1/2 | 1.2500 |
| $F_{oe}$–$F_{of}$ | .50 | 2/3 | 1 | 1/2 | 1.5000 |

TABLE 2

Dual Beam Synthetic Line Mode Range Grid Table

| Center Freq. ($F_0$-Mhz) | Beam-former Grid (λ) | Baseband Filter L/M | Range Interpolator R/S | Post-Detection Decimation | Final Range Grid (λ) |
|---|---|---|---|---|---|
| $F_{oa}$–$F_{ob}$ | .25 | 1 | 1 | 1 | .2500 |
| | | 1 | 8/5 | 1/2 | .3125 |
| | | 1 | 4/3 | 1/2 | .3750 |
| | | 1 | 8/7 | 1/2 | .4375 |
| | | 1 | 1 | 1/2 | .5000 |
| | | 4/5 | 1 | 1/2 | .6250 |
| | | 2/3 | 1 | 1/2 | .7500 |
| | | 4/7 | 1 | 1/2 | .8750 |
| | | 1/2 | 1 | 1/2 | 1.0000 |
| | | 2/5 | 1 | 1/2 | 1.2500 |
| $F_{oa}$–$F_{ob}$ | .25 | 1/3 | 1 | 1/2 | 1.5000 |
| $F_{oc}$–$F_{od}$ | .50 | 1 | 2 | 1 | .2500 |
| | | 1 | 8/5 | 1 | .3125 |

TABLE 2-continued

Dual Beam Synthetic Line Mode Range Grid Table

| Center Freq. ($F_0$-Mhz) | Beam-former Grid (λ) | Baseband Filter L/M | Range Interpolator R/S | Post-Detection Decimation | Final Range Grid (λ) |
|---|---|---|---|---|---|
| | | 1 | 4/3 | 1 | .3750 |
| | | 1 | 8/7 | 1 | .4375 |
| | | 1 | 2 | 1/2 | .5000 |
| | | 1 | 8/5 | 1/2 | .6250 |
| | | 1 | 4/3 | 1/2 | .7500 |
| | | 1 | 8/7 | 1/2 | .8750 |
| | | 1 | 1 | 1/2 | 1.0000 |
| | | 4/5 | 1 | 1/2 | 1.2500 |
| $F_{oc}$–$F_{od}$ | .50 | 2/3 | 1 | 1/2 | 1.5000 |
| $F_{oe}$–$F_{of}$ | 1.0 | 1 | 4 | 1 | .2500 |
| | | 1 | 8/3 | 1 | .3750 |
| | | 1 | 2 | 1 | .5000 |
| | | 1 | 8/5 | 1 | .6250 |
| | | 1 | 8/3 | 1/2 | .7500 |
| | | 1 | 2 | 1/2 | 1.0000 |
| | | 1 | 8/5 | 1/2 | 1.2500 |
| $F_{oe}$–$F_{of}$ | 1.0 | 1 | 4/3 | 1/2 | 1.5000 |

For example, in single beam mode (Table 1) if the calculated value for MRG is 0.60 and $F_0$ is in the range $F_{oc}$–$F_{od}$, then the selected final range grid would be 0.625. Once the final range grid has been selected from the appropriate table, the corresponding values for the initial range grid, L/M, R/S, and the post-detection decimation factor are found on the corresponding line of the table.

When the user interface 92 is used to enlarge a portion of a displayed image, the system control 90 automatically selects the new final range grid and corresponding filter settings. For example, in the case where D2–D1 equals 150 mm, D4–D3 equals 45 mm, $F_0$ equals 4.0 MHz (within the range $F_{oc}$–$F_{od}$), and MAX_DISPLAY_SAMPLES equals 512, Eq. 1 sets the parameter MRG equal to 0.76 for the image 94 of FIG. 15 and to 0.23 for the image 98 of FIG. 16. Using Table 1, the control system 90 sets L/M equal to 4/7 and R/S equal to 1, and causes the post detection filter to decimate by ½ for the image 94 of FIG. 15. In contrast, when the enlarged image 98 of FIG. 16 is displayed, the control system sets L/M and RIS equal to 1 and causes the post detection filter to operate in bypass mode. The filter response curves of FIGS. 5 and 13 clearly show that these settings for the various filters cause the bandwidth for the samples supplied to the video filter 70 to be greater for the enlarged image 98 than for the original image 94.

The foregoing approach to the determination of the final range grid defines the number of samples along a given scan line supplied to the video filter as follows:

$$FOV \text{ display samples} = \frac{FOV \text{ (mm)} \times F_0 \text{ (MHz)}}{1.54 \text{ (mm/}\mu\text{sec)FINAL\_RANGE\_GRID}} \quad \text{(Eq. 2)}$$

This appropriate selection of MAX_DISPLAY_SAMPLES in the previous calculations allows generation of a sample set that closely matches the number of pixels available in the display, or is slightly over sampled with respect to the number of pixels available in the display.

FIGS. 17 and 18 provide block diagrams of alternative implementations of the present invention. In the system of FIG. 17 all decimation to the final range grid is done after the detection stage 56' in the video filter 70'. Up-sampling, if any, is done prior to the detection stage 56'. The baseband filter 18' may be deleted if desired.

In the embodiment of FIG. 18 decimation and interpolation functions are combined in the base-band filter 18", and the video filter 70" performs all post-detection decimation.

Figure 19:
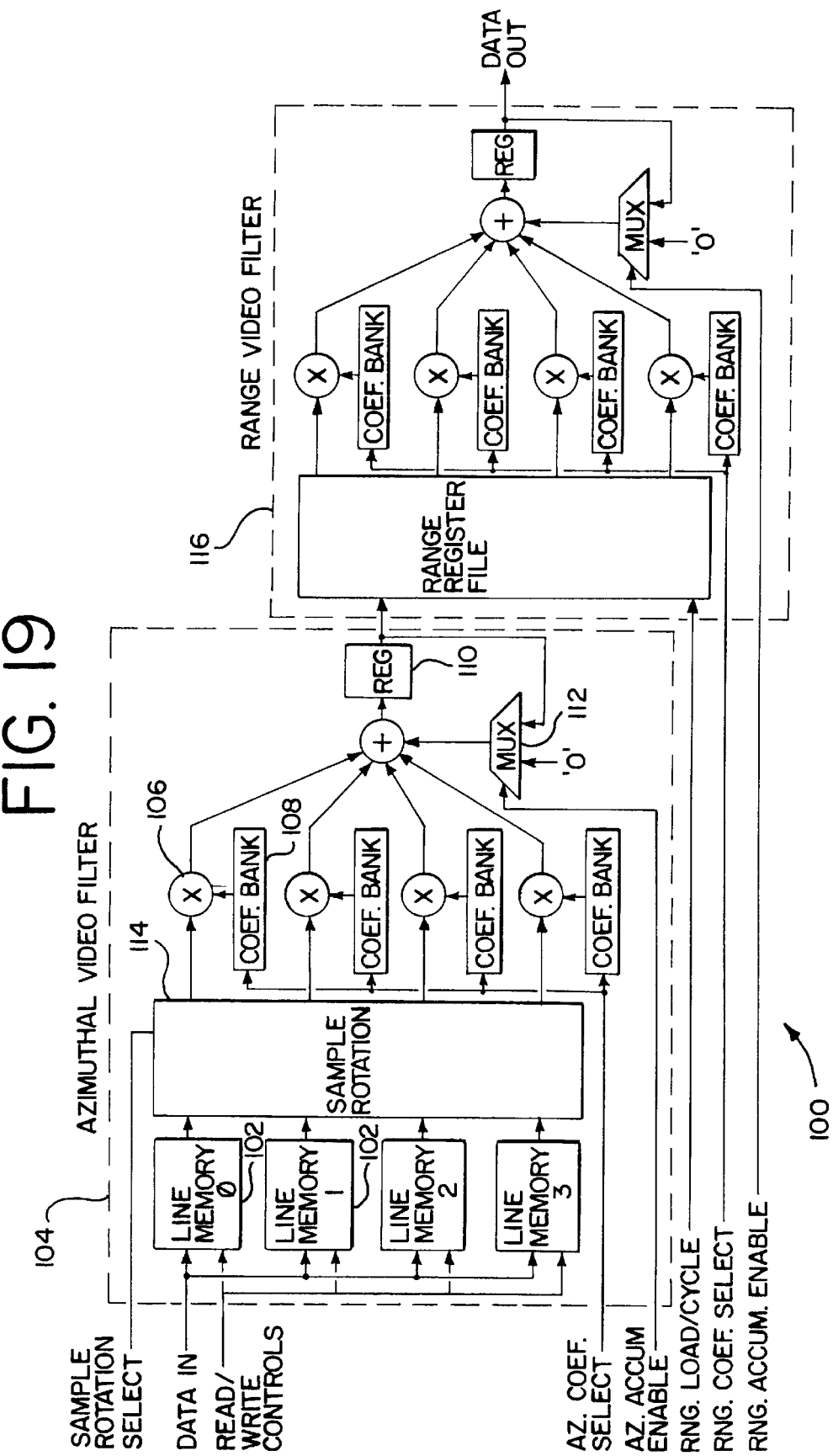
FIG. 19 is a block diagram of an alternative embodiment of a video filter suitable for use in the embodiment of FIG. 1.

The video filter 70, as well as any of the other filters previously described, can be extended to operate in two or more dimensions. FIG. 19 shows a preferred embodiment for a two dimensional video filter 100 which performs filtering in azimuth followed by filtering in range. Either separable or nonseparable filter structures can be employed in the implementation of a multidimensional filter, as is well known in the art and described in detail by D. E. Dudgeon and R. M. Mersereau in *Multidimensional Digital Signal Processing*, Prentice Hall, 1984.

Figure 20:
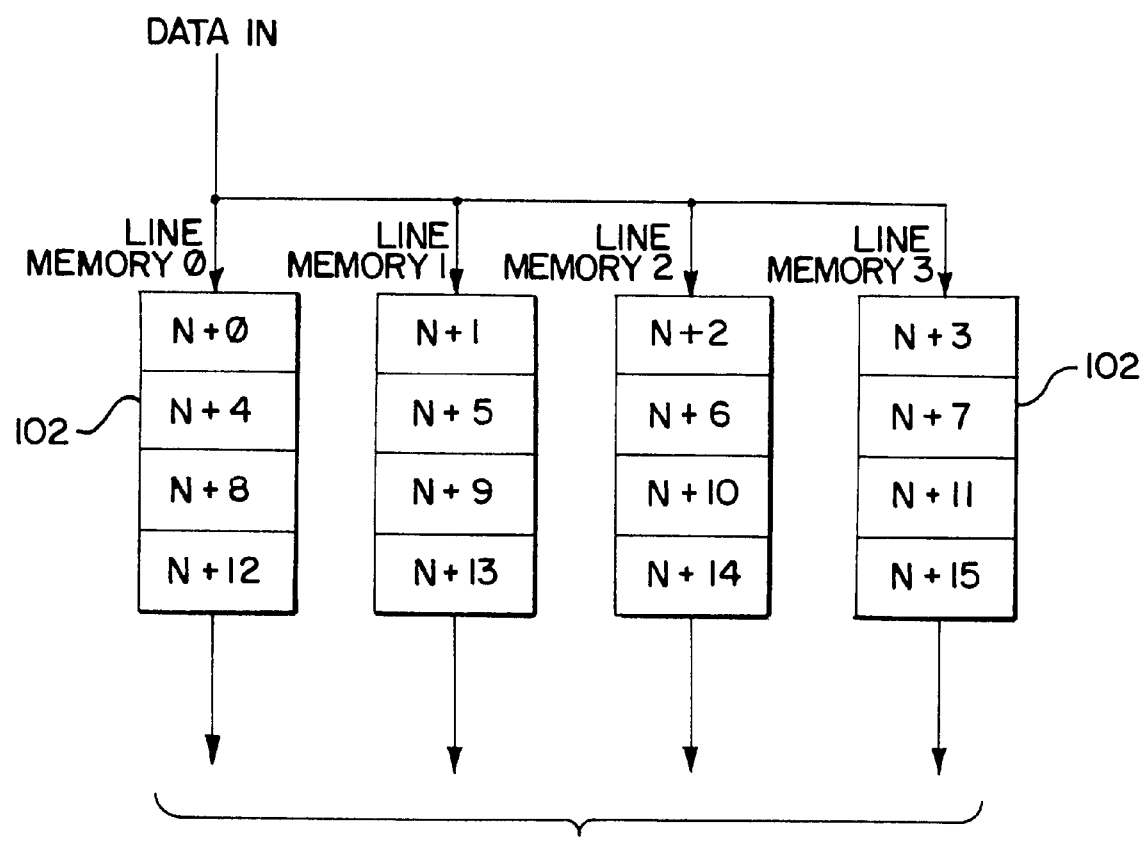
FIG. 20 is a diagram illustrating operation of the video filter of FIG. 19.

In the video filter 100 of FIG. 19, data samples comprising a scan line are received and stored in a line memory block that includes four line memories 102. Each line memory 102 is capable of storing four complete scan lines, with spatially adjacent scan lines stored in adjacent line memories. FIG. 20 shows one example of the manner in which input samples can be stored in the line memories 102. Beginning with the first scan line of an acoustic frame, sixteen spatially adjacent scan lines (N, N+1, N+2, N+3, . . . N+15) are sequentially stored, with the seventeenth scan line overriding the first scan line N. This circular buffer operation allows storage of the last sixteen spatially adjacent scan lines relative to any scan line in the acoustic frame. In FIG. 20, N is an index that refers to the first scan line in each successive group of sixteen scan lines in an acoustic frame (i.e., N=0, 16, 32, . . . ), and N+k is the specific scan line within the acoustic frame.

Returning to FIG. 19, the video filter 100 includes an azimuthal video filter 104 which comprises an eight tap FIR filter. The first set of four samples corresponding to the same depth on spatially adjacent scan lines is output from the line memories 102 to a set of four multipliers 106, which weight the samples by corresponding coefficients. These coefficients are stored in coefficient banks 108 and are selected by the azimuth coefficient select control. The weighted samples of the first set are summed and fed back through an output register 110 and a multiplexer 112, such that the sum is subsequently accumulated (summed) with a weighted second set of four samples, also corresponding to the same depth but from the next group of spatially adjacent scan lines. The azimuth accumulator enable control is inactive for the first set of samples and active for the second set to enable the sums of the two sets of weighted samples to accumulate in the output register 110.

The azimuth coefficient select control selects a different set of coefficients corresponding to the specific set of four samples from the line memories 102. Additionally, although each set of four samples input into the multipliers are from spatially adjacent scan lines, the order of the samples within the four may not be sequential. For example, to filter the set of eight samples at the same depth on spatially adjacent scan lines N+1 through N+8, the first set of four samples read from the line memories 102 of FIG. 20 would be from scan lines N+4, N+1, N+2, N+3, respectively, and the second set would be from scan lines N+8, N+5, N+6, N+7, respectively. A set of four samples read from the line memories 102 are read from spatially adjacent scan lines but are not always in sequential scan line order. Scan line ordering of the samples within a set of four samples is dependent upon the location in the line memories 102 of the first line in the group of eight lines to be filtered.

Each set of four samples read from the line memories 102 is rotated into sequential scan line order by a sample rotation stage 114 to align the samples with the corresponding coefficients selected by the azimuth coefficient select control (FIG. 19). In alternative embodiments the sample rotation stage 114 can be eliminated, and a different set of coefficients can be selected by the azimuth coefficient select control depending upon the specific scan line ordering of the samples within the set.

The preferred embodiment for the azimuthal video filter 104 employs two passes as described above in generating each filtered output sample. This reduces the amount of hardware and the cost of implementation for the eight tap filter. The filter can be implemented using ASIC technology, using commercially available components, or using a combination of these two approaches. Other embodiments of this filter may include a different number of taps, or may be comprised of IIR or nonlinear filter structures.

Additionally, alternative embodiments can effect an azimuthal sample rate change in combination with the filtering operation to decimate or interpolate the line sample set. U.S. patent application Ser. No. 08/418,640, assigned to the assignee of the present invention and entitled "Method and Apparatus for Coherent Image Formation", discloses an ultrasonic imaging system which increases the sample rate in both range and azimuth prior to detection of the acoustic signal. Still other embodiments can vary the coefficients as a function of either range, azimuth, or both dimensions to modify the filtering function in response to the sample position within the acoustic frame.

The azimuthal video filter 104 supplies output samples in range along a filtered scan line to a range video filter 116. The range video filter operates on range samples as previously described in connection with the video filter 70.

Two dimensionally sampled acoustic data (pre-scan conversion) may have varying spatial frequency content due to scan format geometry, aperture end line effects, scan line spacing, beam width in range, beam width line to line, and specific processing or filtering performed in the generation of the detected acoustic data to be scan converted and displayed. In some cases resampling of the variable spatial frequency acoustic data to the display grid by the scan converter can introduce visible artifacts in the displayed image. Such artifacts can be eliminated or reduced with acoustic image filtering that is dependent on position within the image.

For example, the azimuthal video filter 104 can utilize coefficients which vary in range to provide reduced spatial frequency content in the azimuthal dimension in the near field of a sector image, and to increase the spatial frequency content with increasing range. This approach may be used to reduce aliasing artifacts in the near field of a sector image due to subsampling (decimation) that occurs in the near field when resampling to the display grid.

The azimuthal video filter 104 can utilize coefficients which vary in azimuth to provide similar azimuthal spatial frequency control for the lateral edges of the image with respect to the central portion of the image, or for one lateral side of the image with respect to the other lateral side of the image. A trapezoidal image format which has the center portion of the image field comprised of parallel scan lines and scan lines on the outer edges originating at a common apex with some angular displacement may benefit from an azimuthal filter that varies filter coefficients both as a function of range and azimuthal position within the acoustic image.

Additional considerations for varying the filter response within the acoustic image include the need to maintain the symmetrical nature of the two-dimensional impulse response (point spread function). For instance, if the beam width increases with range in a scan format, the point spread function will become asymmetrical as it broadens laterally with increasing range. By employing a range varying range filter to reduce the spatial frequency content as a function of range, the point spread function can be shaped to maintain a more symmetrical form. Additionally, the filter response of the range filter may vary with azimuthal coordinate within a frame.

As described above, bandwidth limiting operations can be used to suppress artifacts. Additionally, the filters described above can be employed to perform image enhancement operations. For example, edge enhancement can be performed by employing a filter response that increases for higher spatial frequencies, and may also vary as a function of the position of the region being filtered within the acoustic image field. Image enhancement and artifact suppression functions can be combined in a filter response that provides high frequency peaking prior to band limiting.

From the foregoing, it should be apparent that an ultrasonic imaging system has been described in which an ultrasonic signal is sampled on a variable range grid to generate an optimally sampled data set closely matching the fundamental display resolution over which the signal is displayed. The acoustic signal may correspond to all or any portion of an acoustic scan line, and the resulting sampling grid is optimized for the display format, display resolution, and the arbitrarily selected field of view.

The approach discussed above for providing an optimally sampled data set in the range dimension prior to scan conversion can be applied to the azimuthal dimension as well. The sampling rate in the azimuthal direction can be changed in several ways in order to cause the azimuthal sampling rate to match the pixel characteristic of the display. For example, the fundamental beam spacing and beam width may be adjusted in the azimuthal direction according to the size of the region to be displayed, the pixel characteristics of the display, the scan format, and the desired frame rate. Azimuthal interpolation can be performed prior to detection, as described in the above-identified U.S. patent application Ser. No. 08/418,640 to modify the azimuthal sample rate as appropriate for the particular pixel characteristics. Decimation down to a final azimuthal sampling grid can be performed after the azimuthal video filter.

In the systems described above an acoustic signal on a variable range grid is generated prior to scan conversion, and the scan converter performs spatial transformation and final resampling of the acoustic signal to the display grid. The display grid is the final grid on to which data is to be mapped or resampled, and the display grid should sufficiently sample the acoustic signal to prevent aliasing, as is well known in the art. Since the number of video lines is fixed for a given monitor resolution and display format, the number of samples in range along an acoustic scan line is varied along with the bandwidth of the signal to generate an optimally sampled signal which can be subsequently employed in scan conversion for generating the displayed image without aliasing artifacts. This optimally sampled signal (i.e., the final range grid) has a ratio near 1:1 between the number of samples in range along the portion of the acoustic scan line that is displayed and the number of video lines over which the information is displayed. In this way the amount of data being processed is reduced to a minimum while the information content that can be displayed without aliasing artifacts is maximized.

Also, the desired optimal sample grid for a scan line may actually vary from scan line to scan line within an image field, since the number of video lines over which the information is displayed may vary for each scan line depending on the scan format geometry. In this case, a single final range grid value may be optimal for one or a set of scan lines within the image field, with the remaining scan lines being oversampled to a varying degree. Alternatively, each scan line or set of scan lines can employ a potentially different sample grid section to allow a more optimally sampled image field, at the expense of added complication to the scan converter.

Another aspect of the systems described above is that aliasing artifacts introduced by the nonlinear detection and log compression operations are reduced by sufficiently oversampling the acoustic signal prior to nonlinear processing. Nonlinear processing introduces spectral broadening which requires over sampling of an image field in both range and azimuth if all information is to be preserved through the detection process. By oversampling the signal at a rate sufficiently above the Nyquist rate, greater separation is provided between spectra repeating at harmonics of the sampling frequency.

As described above, the baseband filter 18, the range interpolation filter 36 and the post-detection filter 60 cooperate to form a means for converting the acoustic signals on the initial sample grid to processed acoustic signals on a modified sample grid prior to scan conversion. The filters 18, 36, 60 individually also correspond to such converting means. The user interface 92 and the system control 90 cooperate to form a means for controlling the converting means to vary the modified sample grid as a function of the pixel parameter.

As used herein, the following terms are to be defined as set out below, unless the context indicates otherwise. Acoustic signals include signals indicative of received ultrasonic echos prior to detection, whether at RF, IF or baseband, as well as signals indicative of received ultrasonic echos after detection and prior to scan conversion.

Pixel parameter means any parameter or set of parameters that provides information regarding the resolution, number of pixels, number of TV lines or other characteristics of the display or display format with which an ultrasonic image is to be presented. MAX_DISPLAY_SAMPLES of Eq 1 is one example of a pixel parameter.

The term "responsive to" is intended broadly such that an element is responsive to a signal both when the element is directly responsive to the signal, and when the element is responsive to a processed, modified or filtered form of the signal.

An element is said to operate as a function of a parameter when the operation of the element varies as the parameter varies, whether or not other parameters also have an impact on the operation of the element.

The term "modified sample grid" is intended to refer to any grid that is different from the initial grid of samples provided by the beamformer (in a digital system) or by an A-D converter (in an analog system), in either the range or azimuthal dimension, or both.

Of course, it should be understood that a wide range of changes and modifications can be made to the preferred embodiments described above. For example, the functions described above can be implemented with analog as well as digital filtering techniques. In addition to FIR, IIR and nonlinear filter structures, adaptive filtering techniques can also be used in which the filter coefficient set (impulse response) is responsive to one or more samples taken from the current image field and one or more previous image fields, if desired. Also, it should be understood that bandwidth of the acoustic signal in both range and azimuth can be adjusted in the beamformer, and in some cases the beamformer can be used to perform the desired band limiting to prevent aliasing artifacts, instead of using a low pass filter. If desired, one or more of the filters 18, 36, 60, 70 can operate in non-linear manner, as described in Hedberg U.S. Pat. No. 5,396,285, assigned to the assignee of the present invention.

It is intended that the foregoing detailed description be understood as an illustration of selected forms that the invention can take and not as a definition of the invention. It is only the following claims, including all equivalents, which are intended to define the scope of this invention.

What is claimed is:

1. In an ultrasonic imaging system of the type comprising a beamformer stage operative to generate a frame of acoustic signals on an initial sample grid, and a display characterized by a pixel parameter, wherein the frame defines an azimuthal dimension, the improvement comprising:

means for converting the acoustic signals on the initial sample grid to processed acoustic signals on a modified sample grid prior to scan conversion; and means for controlling the converting means to vary the modified sample grid in the azimuthal dimension as a function of the pixel parameter.

2. The invention of claim 1 wherein the converting means comprises at least one interpolator.

3. The invention of claim 1 wherein the converting means comprises at least one decimator.

4. The invention of claim 1 wherein the controlling means optimizes the modified sample grid prior to scan conversion for display of the processed acoustic signals on the display.

5. The invention of claim 1 wherein the frame defines the azimuthal dimension and a range dimension, and wherein the invention further comprises means for filtering the acoustic signals in the azimuthal direction as a function of an acoustic signal coordinate within the frame.

6. The invention of claim 5 wherein the coordinate comprises a range coordinate.

7. The invention of claim 5 wherein the coordinate comprises an azimuthal coordinate.

8. The invention of claim 1 wherein the frame defines the azimuthal dimension and a range dimension, and wherein the invention further comprises means for filtering the acoustic signals in the range direction as a function of an acoustic signal coordinate within the frame.

9. The invention of claim 8 wherein the coordinate comprises a range coordinate.

10. The invention of claim 8 wherein the coordinate comprises an azimuthal coordinate.

11. The invention of claim 1 wherein the frame defines a range dimension, and wherein the controlling means varies the modified sample grid in the range dimension as a function of the pixel parameter.

12. In an ultrasonic imaging system of the type comprising a beamformer stage operative to generate a frame of acoustic signals on an initial sample grid, wherein the frame defines an azimuthal dimension, and a display characterized by a pixel parameter, the improvement comprising:

least one variable interpolator responsive to the acoustic signals to generate processed acoustic signals on a modified sample grid prior to scan conversion; said modified sample grid having an increased number of samples in at least the azimuthal dimension as compared to the initial sample grid; and means for controlling the interpolator to vary the modified sample grid as a function of the pixel parameter.

13. The invention of claim 12 wherein the modified sample grid has an increased number of samples in each of at least two dimensions as compared to the initial sample grid.

14. In an ultrasonic imaging system of the type comprising a beamformer stage operative to generate a frame of acoustic signals on an initial sample grid, wherein the frame defines an azimuthal dimension, and a display characterized by a pixel parameter, the improvement comprising:

at least one variable decimator responsive to the acoustic signals to generate processed acoustic signals on a modified sample grid prior to scan conversion, said modified sample grid having a reduced number of samples in at least the azimuthal dimension as compared to the initial sample grid; and means for controlling the decimator to vary the modified sample grid as a function of the pixel parameter.

15. The invention of claim 14 wherein the modified sample grid has a reduced number of samples in each of at least two dimensions as compared to the initial sample grid.

16. The invention of claim 1 wherein the controlling means varies the modified sample grid as a function of a center frequency parameter.

17. In an ultrasonic imaging system of the type comprising a beamformer stage operative to generate a frame of acoustic signals defining two dimensions, and a pixel parameter characteristic of a display, the improvement comprising:

means for variably filtering the acoustic signals in two dimensions prior to scan conversion; and means for controlling the variably filtering means to vary the bandwidth as a function of the pixel parameter and an acoustic signal coordinate within the frame.

18. The invention of claim 17 further comprising a means for converting the acoustic signals on the initial sample grid to processed acoustic signals on a modified sample grid prior to scan conversion as a function of the acoustic signal coordinate and the pixel parameter.

* * * * *

UNITED STATES PATENT AND TRADEMARK OFFICE
CERTIFICATE OF CORRECTION

PATENT NO. : 5,919,137
DATED : July 6, 1999
INVENTOR(S) : David J. Finger et al.

It is certified that error appears in the above-identified patent and that said Letters Patent is hereby corrected as shown below:

<u>On the Title Page</u>

Page 2, column 2, line 29, after "*For*" add --*Use*--.

<u>In the Specification</u>

Column 2, line 47, after "beamformers" change "," (comma) to --.-- (period).

Column 3, line 23, after "12" add --.-- (period).

Column 9, line 3, change ≥ to -->--.

Column 10, line 42, change "RIS" to --R/S--.

Signed and Sealed this

Eighteenth Day of April, 2000

Attest:

Q. TODD DICKINSON

*Attesting Officer*      *Director of Patents and Trademarks*